(12) United States Patent
Kashiwagi et al.

(10) Patent No.: US 11,934,366 B2
(45) Date of Patent: Mar. 19, 2024

(54) VERSION PROCESSING APPARATUS, METHOD, AND PROGRAM

(71) Applicant: NIPPON TELEGRAPH AND TELEPHONE CORPORATION, Tokyo (JP)

(72) Inventors: Keiichiro Kashiwagi, Musashino (JP); Hisaharu Ishii, Musashino (JP); Koki Mitani, Musashino (JP); Kenji Umakoshi, Musashino (JP); Tomoyuki Fujino, Musashino (JP); Yui Saito, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 47 days.

(21) Appl. No.: 17/426,507

(22) PCT Filed: Dec. 23, 2019

(86) PCT No.: PCT/JP2019/050400
§ 371 (c)(1),
(2) Date: Jul. 28, 2021

(87) PCT Pub. No.: WO2020/158251
PCT Pub. Date: Aug. 6, 2020

(65) Prior Publication Data
US 2022/0114152 A1    Apr. 14, 2022

(30) Foreign Application Priority Data

Jan. 29, 2019   (JP) ................................. 2019-013183

(51) Int. Cl.
*G06F 16/00*     (2019.01)
*G06F 16/21*     (2019.01)
(Continued)

(52) U.S. Cl.
CPC .......... *G06F 16/219* (2019.01); *G06F 16/212* (2019.01); *G06F 16/2365* (2019.01); *G06F 16/25* (2019.01); *G06F 16/285* (2019.01)

(58) Field of Classification Search
CPC ...... G06F 16/214; G06F 8/71; G06F 11/3664; G06F 11/368; G06F 11/3688;
(Continued)

(56) References Cited

U.S. PATENT DOCUMENTS 5,734,899 A     3/1998  Yoshizawa et al.
7,769,904 B2 *  8/2010  Eller ..................... G06F 40/143
                                                    709/200

(Continued)

OTHER PUBLICATIONS

"Implementing API of Large-scale House Log Data Platform in Smart City" by Shintaro Yamamoto, Shinsuke Matsumoto, and Masahide Nakamura, The institute of electronics, information and communication engineers, Technical report of IEICE, 112.305 (2012): pp. 27-32.

(Continued)

*Primary Examiner* — Shyue Jiunn Hwa
(74) *Attorney, Agent, or Firm* — Harness, Dickey & Pierce, P.L.C.

(57) ABSTRACT

An information processing apparatus according to an embodiment includes: a common data model management unit that manages information indicating a common data model corresponding to a plurality of modules in common; a unique data model management unit that manages information indicating a unique data model corresponding to at least one of the modules; and a common management unit that manages a version of a module corresponding to the common data model managed by the common data model management unit, a version of a module corresponding to the unique data model managed by the unique data model (Continued)

management unit, and a version of a module corresponding to a newly installed data model, and verifies compatibility of the versions.

6 Claims, 14 Drawing Sheets

(51) Int. Cl.
*G06F 16/23* (2019.01)
*G06F 16/25* (2019.01)
*G06F 16/28* (2019.01)

(58) Field of Classification Search
CPC ...... G06F 16/27; G06F 16/986; G06F 21/577; G06F 21/604; G06F 21/6254; G06F 2221/034; G06F 3/0482; G06F 3/0486; G06F 40/106; G06F 40/143; G06F 40/166; G06F 16/2246; G06F 16/289; G06F 16/2453; G06F 16/24542; G06F 16/24564; G06F 9/449; G06F 9/465; G06F 9/54; G06F 11/3055; G06F 11/3082; G06F 11/32; G06F 11/34; G06F 11/3495; G06F 12/0261; G06F 15/161; G06F 16/21; G06F 16/3334; G06F 16/335; G06F 16/951; G06F 16/958; G06F 16/972; G06F 2201/81; G06F 2209/5015; G06F 2209/542; G06F 40/151; G06F 8/10; G06F 8/20; G06F 8/36; G06F 8/70; G06F 9/44505; G06F 9/4492; G06F 9/45512; G06F 9/46; G06F 9/4843; G06F 9/5061; G06F 9/5077
See application file for complete search history.

(56) References Cited

U.S. PATENT DOCUMENTS

| | | | |
|---|---|---|---|
| 2003/0167398 A1 | 9/2003 | Sueyoshi et al. | |
| 2013/0262685 A1* | 10/2013 | Shelton | G06F 1/3203 709/226 |
| 2015/0212989 A1* | 7/2015 | Rice | G06F 16/986 715/234 |
| 2016/0019244 A1 | 1/2016 | Liu et al. | |
| 2017/0109652 A1* | 4/2017 | Stein | G06N 20/00 |
| 2020/0028936 A1* | 1/2020 | Gupta | H04L 67/02 |

OTHER PUBLICATIONS

Yamamoto, Hidenori et al., Heterogenous System Linkage Functions in IT Infrastructure for Smart Cities. IPSJ Journal of Digital Practices, Jul. 15, 2014, vol. 5, No. 3, pp. 205-212, in particular, pp. 206-210.
Aco, I/O, Mar. 1, 2003, vol. 28, No. 3, pp. 12-14, in particular, pp. 12-13, non-official translation (Basic knowledge for video Editing).
International Search Report issued PCT/JP2019/050400, dated Mar. 24, 2020.

* cited by examiner

| Class name | Data type | Open/Private |
|---|---|---|
| ClassA | string | 1 |
| ClassB | string | 0 |

F I G. 2

| Data model version | Corresponding application version | Corresponding converter version |
|---|---|---|
| CommonDatamodelver1 | AppA ver1,AppB ver1-2,AppC ver1-2 | DeviceA ver1, DeviceB ver1-2 |
| NewDatamodel ver1 | AppB ver2,AppC ver2,AppD ver1 | DeviceB ver2 |

F I G. 3

| | |
|---|---|
| API for application of unique data model | /API name/API version/class/{vendor name}/data model name}/class name}/instance/{device identification ID}/... |
| API for device of unique data model | /API name/class/{vendor name}/data model name}/class name}/instance/{vendor name}/data model name}/device identification ID}/moment /{time stamp} |

F I G. 5

VERSION PROCESSING APPARATUS, METHOD, AND PROGRAM

FIELD

Cross-Reference to Related Applications

This is a U.S. national phase application under 35 USC 371 of International Application No. PCT/JP2019/050400 (not published in English), filed on Dec. 23, 2019, which claims priority to Japanese Application No. 2019-013183 filed on Jan. 29, 2019. The entire disclosures of the above applications are incorporated herein by reference.

Embodiments of the present invention relate to an information processing apparatus, a method therefor, and a program therefor.

BACKGROUND

In recent years, an Internet of Things (IoT) system has attracted attention in which data from various sensors or devices are collected and stored to be provided to various application programs (hereinafter, referred to as applications or apps). In the IoT system, a plurality of applications operate on the same platform.

In a conventional system in which a single application uses data pieces collected and stored from devices and the like, a data model and an application programming interface (API) are designed on the assumption of a combination of data pieces frequently required by an application and processing to be executed. For this reason, data pieces are stored in a form that can be easily used by the application.

This provides advantages such as ease of application implementation and optimized performance.

On the other hand, in a recent platform in which a plurality of applications use data pieces stored in one system, contents of processing to be executed and data structures are different for each application. Therefore, attempts have been made to design a data model and an API that can be used in common by a plurality of applications (see, for example, Non Patent Literature 1).

However, when a data model and an API shared by a plurality of applications are designed, a common data model is often designed in which data is structured only by basic information (time, device identification (ID), and the like) as information having a high possibility of being used in any application.

When such a common data model is used, each application must acquire data using a common API and then combine several processes to obtain target data, which may lead to complexity of application implementation and an increase in processing time.

CITATION LIST

Non Patent Literature

Non Patent Literature 1 "Implementing API of Large-scale House Log Data Platform in Smart City" by Shintaro YAMAMOTO, Shinsuke MATSUMOTO, and Masahide NAKAMURA, The institute of electronics, information and communication engineers, Technical report of IEICE, 112.305 (2012): 27-32

SUMMARY

Technical Problem

Enabling coexistence of a plurality of data models and update of data models requires a mechanism for managing information generated from each data model as well as maintaining consistency in the entire system; however, there are various problems in realizing such a mechanism.

The first problem is difficulty in managing settings of various modules, such as applications, converters, connected devices and internal modules, associated with data model changes. The converters convert data generated by each device and transfer the converted data.

As an example, a description will be given of a case where a unique data model corresponding to an application having a new function is installed into the system.

For realizing addition of a function of an application, in the unique data model, a new class definition or the like corresponding to a module, not included in a conventional data model, is added to the data model.

In order for a new application to use data generated by a device connected to the system, the data generated by the device needs to be delivered to the data storage unit in a form corresponding to the class added to the unique data model.

Therefore, setting information corresponding to the unique data model needs to be sent to the converter to change the setting.

In addition, there is also a need for a mechanism for verifying whether there is an inconsistency in the setting information transmitted from a plurality of data models to each module.

The second problem is an influence on compatibility due to adding or updating of a data model definition.

As an example, when a class used in a conventional data model is deleted at the time of updating the data model, a problem occurs in operation of an application using this class.

In order to prevent such a problem, it is necessary to provide a definition of the unique data model so that compatibility between the conventional data model and the unique data model is not broken.

As the third problem, it is necessary to manage which application can use data collected by the unique data model.

In an IoT system including a plurality of applications, there is a need to allow only a specific application to use some data.

The present invention has been made in view of the above circumstances, and an object thereof is to provide an information processing apparatus, a method, and a program capable of facilitating introduction of a module and optimizing processing based on a data model.

Solution to Problem

In order to achieve the object, an aspect of an information processing apparatus according to an embodiment of this invention is that the information processing apparatus includes: a common data model management unit that manages information indicating a common data model corresponding to a plurality of modules in common; a unique data model management unit that manages information indicating a unique data model corresponding to at least one of the modules; and a common management unit that manages a version of a module corresponding to the common data model managed by the common data model management unit, a version of a module corresponding to the unique data model managed by the unique data model management unit, and a version of a module corresponding to a newly installed data model, and verifies compatibility of the versions.

An aspect of an information processing method performed by an information processing apparatus according to an embodiment of the present invention is that the method includes: managing information indicating a common data model corresponding to a plurality of modules in common; managing information indicating a unique data model corresponding to at least one of the modules; and managing a version of a module corresponding to the common data model to be managed, a version of a module corresponding to the unique data model to be managed, and a version of a module corresponding to a newly installed data model, and verifying compatibility of the versions.

Advantageous Effects of Invention

According to the present invention, it is possible to facilitate introduction of a module and optimize processing based on a data model.

BRIEF DESCRIPTION OF THE DRAWINGS

FIG. 2 shows an example of a unique data model definition file in a table format;

FIG. 3 shows an example of data model-module version correspondence information in a table format;

FIG. 5 is a diagram illustrating an example of an API corresponding to the unique data model;

FIG. 10 is a flowchart showing an example of a processing operation when data from an application is referred to;

DETAILED DESCRIPTION

Figure 1:
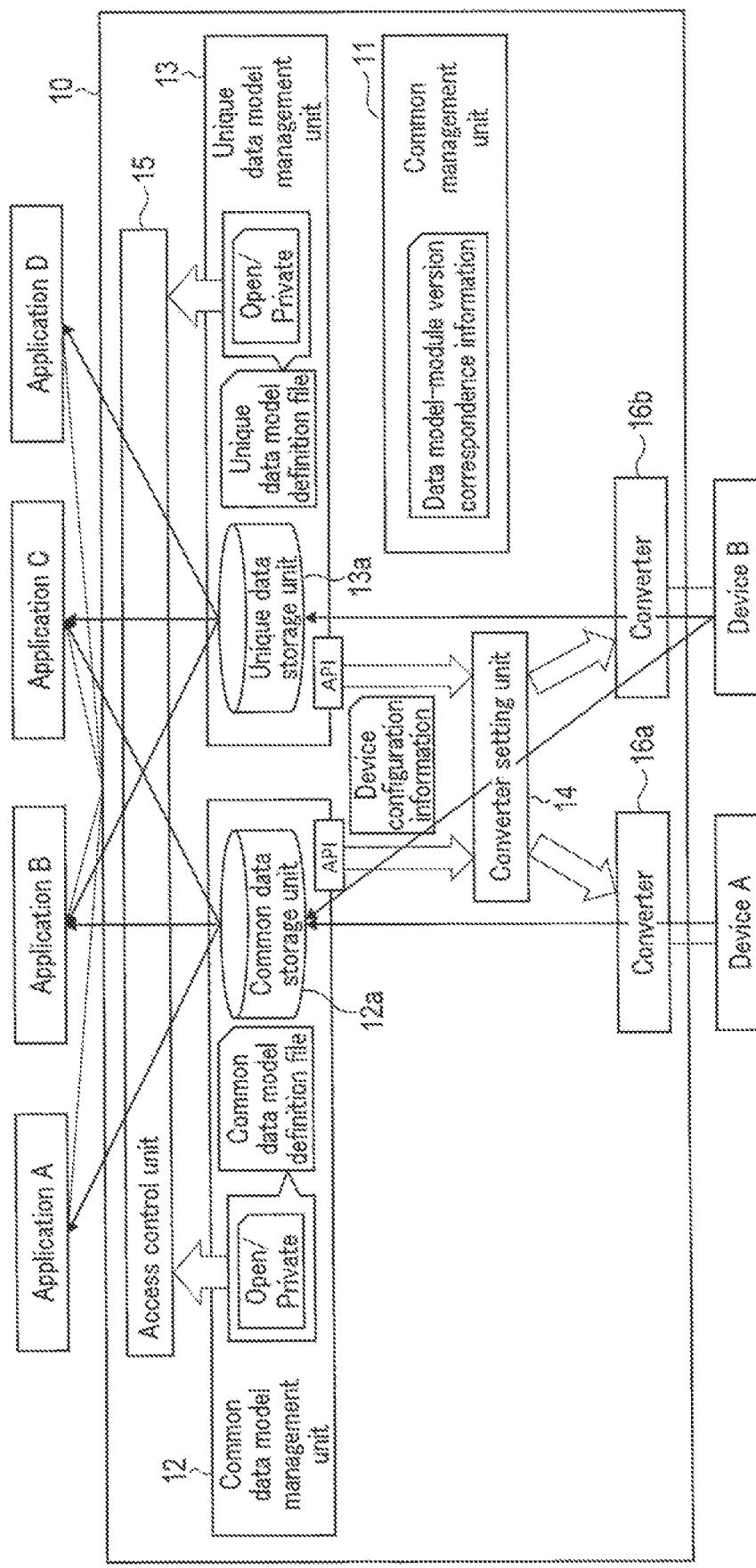
FIG. 1 is a diagram showing an application example of a data processing apparatus according to an embodiment of the present invention.

Hereinafter, embodiments related to this invention will be described with reference to the drawings.

By combining a part or a plurality of the following (1) to (10), an embodiment of the present invention realizes a system in which a common data model corresponding to a plurality of modules in common and a unique data model corresponding to at least one of the plurality of modules coexist, and flexible data model management.

(1) One or more data model definition files are provided, and in accordance with the following (1-1) and (1-2), the data model definition files are installed in a system connected to one or more applications, devices, or converters converting data generated by devices.

(1-1) Regardless of devices connected or applications installed, a shared common data model definition file is installed in the system.

(1-2) If there exists a unique data model definition file corresponding to the device connected to the system or the application installed in the system in addition to the common data model definition file described in (1-1), the unique data model definition file is installed in the system.

(2) Compatibility between the data model definition file installed in (1) and an existing data model definition file is verified.

(3) A version of the data model corresponding to the application, device, converter, internal module, etc. connected to the system is managed, and a correspondence relationship between the version of the data model installed in (1) and the module is registered in the system.

(4) A device identification ID is generated based on the data model definition file installed in (1), a setting template of one or more modules is acquired, and a module is set using the acquired setting template.

The acquired setting template may be verified. The module may also be a converter of the device.

(5) The data model definition file of (1) is defined according to a rule indicated by the following (5-1) to (5-5).

(5-1) A class corresponding to a new module can be added, but a class corresponding to an existing module cannot be changed or deleted.

(5-2) A new relation between classes can be added, but an existing relation between classes cannot be changed or deleted.

(5-3) An attribute of an existing class cannot be added, changed, or deleted.

(5-4) In the definition of the relation between classes, a class as a start point and a class as an end point are determined, and a direction of the relation is determined.

(5-5) A definition of a relation in which processing loops to return to the class of the start point by following one or more relations from a certain class is prohibited.

(6) The data model definition file shown in (1) is defined according to rules indicated by the following (6-1) and (6-2).

(6-1) Information for identifying a vendor and information for identifying a data model are added to a higher level of the class name.

(6-2) Information for identifying a vendor and information for identifying a data model are added to a higher level of the device identification ID.

(7) A relation between the common data model definition file indicated by (1-1) and the unique data model definition file indicated by (1-2) is defined according to rules indicated by the following (7-1) to (7-4).

(7-1) A class representing basic configuration information of a device and a class representing a basic status such as a communication state with a converter are called a common class. The common class is essential in the common data model as well as in the unique data model.

(7-2) The unique data model is used in combination with the common class in the common data model. In the unique data model, a unique class may be defined at a lower level of the common class.

(7-3) A relation from the common data model to the unique data model may be defined.

(7-4) The information of the common class may be used in an access control, a remote procedure call, a management system, a visualization application, or the like.

(8) The API corresponding to the data model definition file described in (1) is defined according to rules indicated by the following (8-1) and (8-2).

(8-1) Information for identifying a vendor and information for identifying a data model are added to a higher level of the class name of an end point of the API.

(8-2) Information for identifying a vendor and information for identifying a data model are added to a higher level of the device identification ID of the end point of the API for the device or the converter of the device.

(9) The data model definition file of (1) is defined according to a rule indicated by the following (9-1).

(9-1) It is defined in the data model definition file that each class is made open to an application or each class is made private to an application satisfying a certain condition.

The certain condition may be (1) it is an application that does not correspond to the version of the data model definition file or (2) it is an application developed by a person other than the developer who has defined the data model definition file.

(10) The class defined as private in (9-1) performs access restriction so that access from an application satisfying the certain condition described in (9-1) is not performed.

The class defined as open in (9-1) is accessible from all applications regardless of the version of the corresponding data model.

In an embodiment of the present invention, not only a common data model but also an application-specific data model is installed as needed, so that various types of applications can be easily implemented and processing of the applications can be optimized.

In an embodiment of the present invention, in a system in which a plurality of modules, for example, applications and converters, are connected, it is possible to manage a correspondence relationship between each data model and module, perform compatibility verification, set information generated from the data model in each module, and install a unique data model.

In order to maintain the compatibility of the data model, in one embodiment of the present invention, a rule to be followed when the data model is defined is set.

Furthermore, when a unique data model, which is a model generating an end point of an API corresponding to a data model defined according to this rule, is installed, access to data is managed for each application.

FIG. 1 is a diagram showing an application example of a data processing apparatus according to an embodiment of the present invention.

As shown in FIG. 1, a data processing apparatus (information processing apparatus) 10 according to an embodiment of the present invention includes a common management unit 11, a common data model management unit 12, an unique data model management unit 13, a converter setting unit 14, an access control unit 15, and converters 16a and 16b.

The converters 16a and 16b are connected to external devices A and B on a one-to-one basis. The functions of the data processing apparatus 10 shown in FIG. 1 are realized by using a processor such as a central processing unit (CPU) that executes a program, and a storage medium such as a random access memory (RAM) and a read only memory (ROM).

The common management unit 11 stores data model-module version correspondence information in an internal memory.

The common data model management unit 12 includes a common data storage unit 12a. The common data model management unit 12 stores, in the internal memory, a common data model definition file defining openness/privateness of data.

The unique data model management unit 13 includes a unique data storage unit 13a. The unique data model management unit 13 stores, in the internal memory, a unique data model definition file defining openness/privateness of data.

The data processing apparatus 10 stores data input from the devices A and B in the common data storage unit 12a or the unique data storage unit 13a. The data processing apparatus 10 provides the data to application A, application B, application C, or application D, based on access control information defined in the common data model definition file or the unique data model definition file.

FIG. 2 shows, in a table format, an example of the unique data model definition file.

As shown in FIG. 2, in the unique data model definition file managed by the unique data model management unit 13, a class name, a data type, and a flag of openness/privateness are managed in association with each other.

The example shown in FIG. 2 indicates that the flag corresponding to the class name "ClassA" and the data type "string" is "1" (open), while the flag corresponding to the class name "ClassB" and the data type "string" is "0" (private).

FIG. 3 shows, in a table format, an example of the data model-module version correspondence information.

As shown in FIG. 3, in the data model-module version correspondence information managed by the common management unit 11, a data model version, a corresponding application version, and a corresponding converter version are managed in association with each other.

The example of FIG. 3 indicates that the version of the common data model (CommonDatamodel) is "ver1"; the version of the corresponding application A (AppA) is "ver1", the version of the application B (AppB) is "ver1-2", and the version of the application C (AppC) is "ver1-2; and the version of the corresponding device A (DeviceA) is "ver1", and the version of the corresponding device B (DeviceB) is "ver1-2".

The example of FIG. 3 further indicates that the version of the new unique data model (NewDatamodel) is "ver1"; the version of the corresponding application B (AppB) is "ver2", the version of the corresponding application C (AppC) is "ver2", and the version of the corresponding application D (AppD) is "ver1"; and the version of the corresponding device B (DeviceB) is "ver2".

Figure 4A:
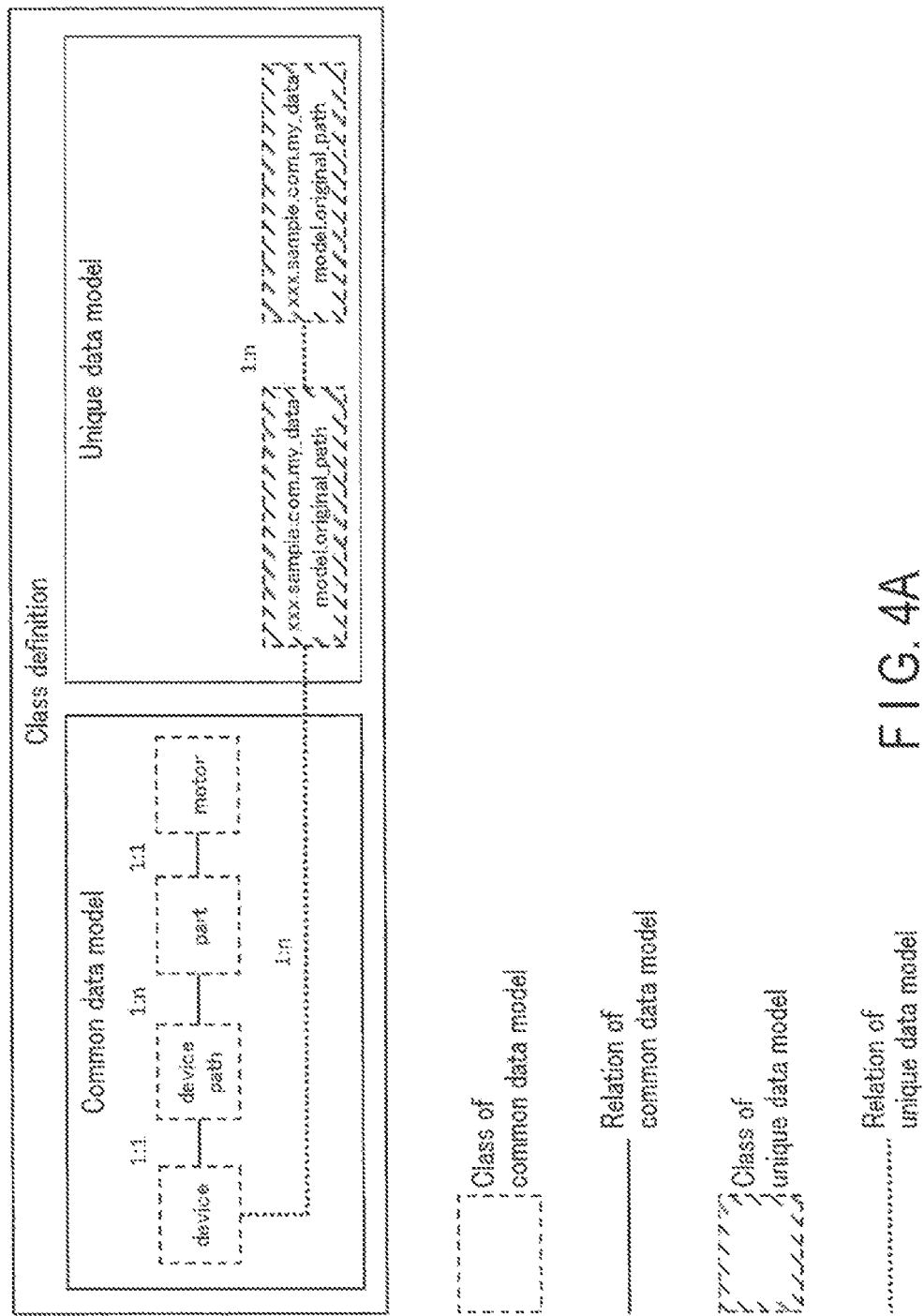
FIG. 4A is a diagram illustrating an example of device configuration information.
Figure 4B:
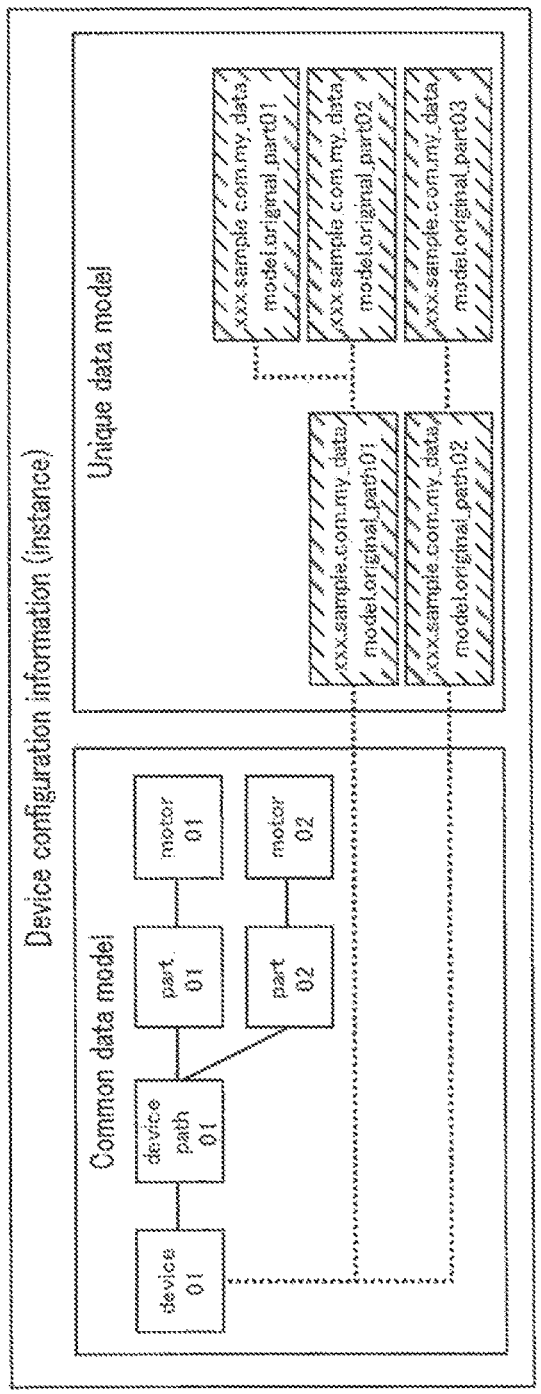
FIG. 4B is a diagram illustrating an example of device configuration information.

FIG. 4A and FIG. 4B are diagrams illustrating examples of device configuration information.

In the examples of FIGS. 4A and 4B, the device configuration information managed by the data processing apparatus 10 includes a class definition corresponding to a module, and device configuration information (instance).

The class definition includes a common data model (classes of a common data model) and a unique data model (classes of a unique data model). The device configuration information (instance) includes a common data model (instance of a common data model) and a unique data model (instance of a unique data model).

In the example shown in FIG. 4A, the classes of the common data model are "device", "device path", "part", and "motor". In this example, a relation of 1:1 is set between "device" and a lower-level "device path", a relation of 1:n is set between "device path" and a lower-level "part", and a relation of 1:1 is set between "part" and a lower-level "motor".

In the example shown in FIG. 4A, the classes of the unique data model are the following (1) and (2).
(1) "xxx.sample.com.my_datamodel.original_path"
(2) "xxx.sample.original_part"

In the example shown in FIG. 4A, a relation of 1:n is set between the class "device" of the common data model and the class "xxx.sample.com.my_datamodel.original_path" of the unique data model, and a relation of 1:n is set between the class "xxx.sample.com.my_datamodel.original_path" and a lower-level "xxx.sample.original_part" of the unique data model.

In the example shown in FIG. 4B, the instances of the common data model are "device01", "devicepath01", "part01", "motor01", "part02", and "motor02".

In the example shown in FIG. 4B, a relation is set between "device01" and a lower-level "devicepath01", and relations are respectively set between "devicepath01" and a lower-level "part01" and between "devicepath01" and a lower-level "part02".

In the example shown in FIG. 4B, a relation is set between "part01" and a lower-level "motor01", and a relation is set between "part02" and a lower-level "motor02".

In the example shown in FIG. 4B, the instances of the unique data model are the following (1) to (5).
(1) "xxx.sample.com.my_datamodel.original_path01"
(2) "xxx.sample.com.my_datamodel.original_path02"
(3) "xxx.sample.original_part01"
(4) "xxx.sample.original_part02"
(5) "xxx.sample.original_part03"

In the example shown in FIG. 4B, a relation is set between the instance "device01" of the common data model and the instance "xxx.sample.original_part01" of the unique data model. In this example, a relation is set between the instance "device01" of the common data model and the instance "xxx.sample.original_part02" of the unique data model.

In the example shown in FIG. 4B, relations are set between "xxx.sample.com.my_datamodel.original_path01" and a lower-level "xxx.sample.original_part01" and between "xxx.sample.com.my_datamodel.original_path01" and a lower-level "xxx.sample.original_part02".

In the example shown in FIG. 4B, a relation is set between "xxx.sample.com.my_datamodel.original_path02" and a lower-level "xxx.sample.original_part02", and a relation is set between "xxx.sample.com.my_datamodel.original_path02" and a lower-level "xxx.sample.original_part03".

FIG. 5 is a diagram illustrating an example of an API corresponding to a unique data model.

In the example shown in FIG. 5, in an API for an application of a unique data model, "/API name/API version/class/{vendor name} {data model name} {class name}/instance/{device identification ID}/ . . . " is defined.

In the example shown in FIG. 5, in an API for a device of a unique data model, "/API name/class/{vendor name} {data model name} {class name}/instance/{vendor name} {data model name} {device identification ID}/moment/{time stamp}" is defined.

Figure 6A:
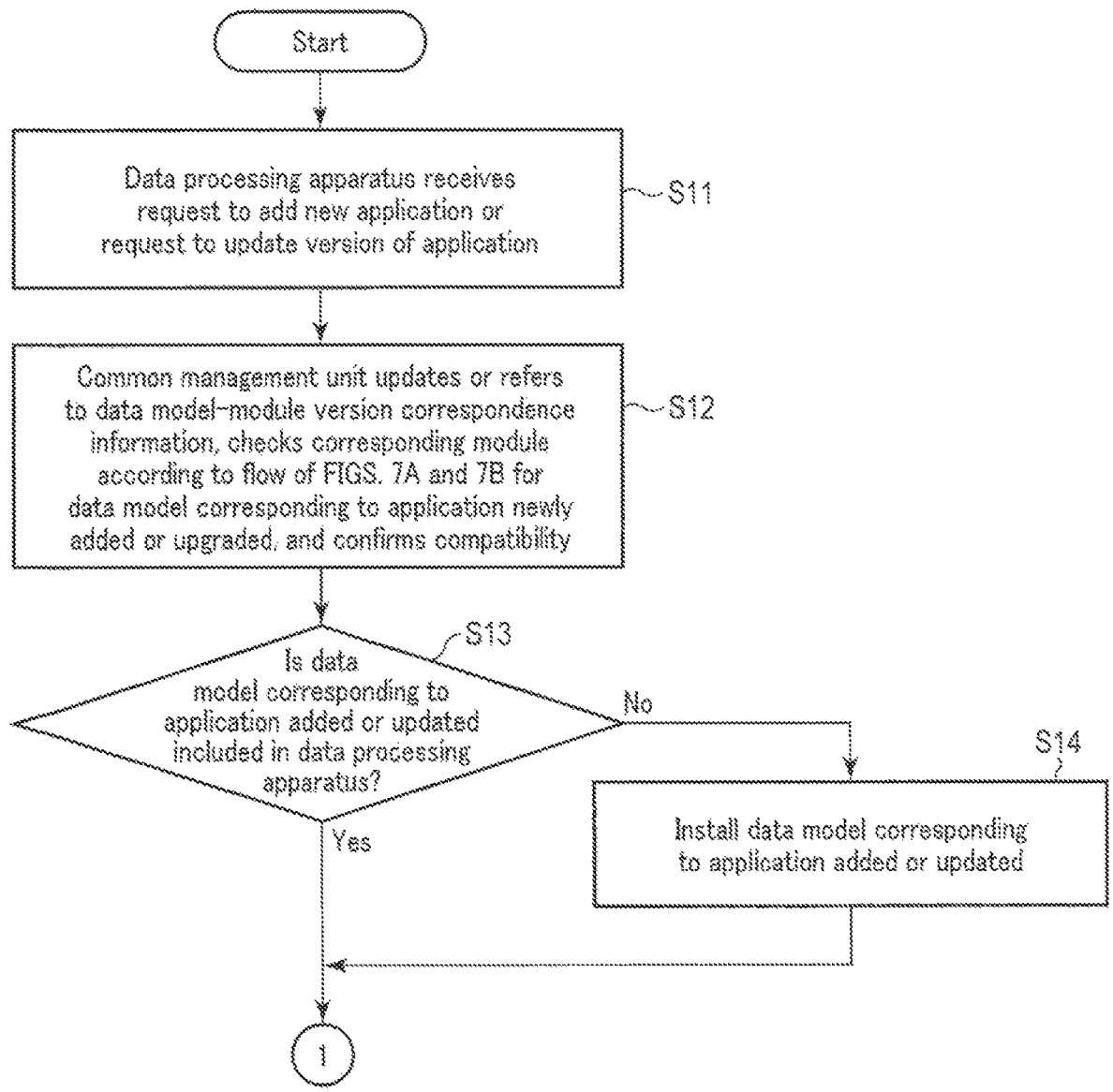
FIG. 6A is a flowchart showing an example of a processing procedure when an application is added or updated.
Figure 6B:
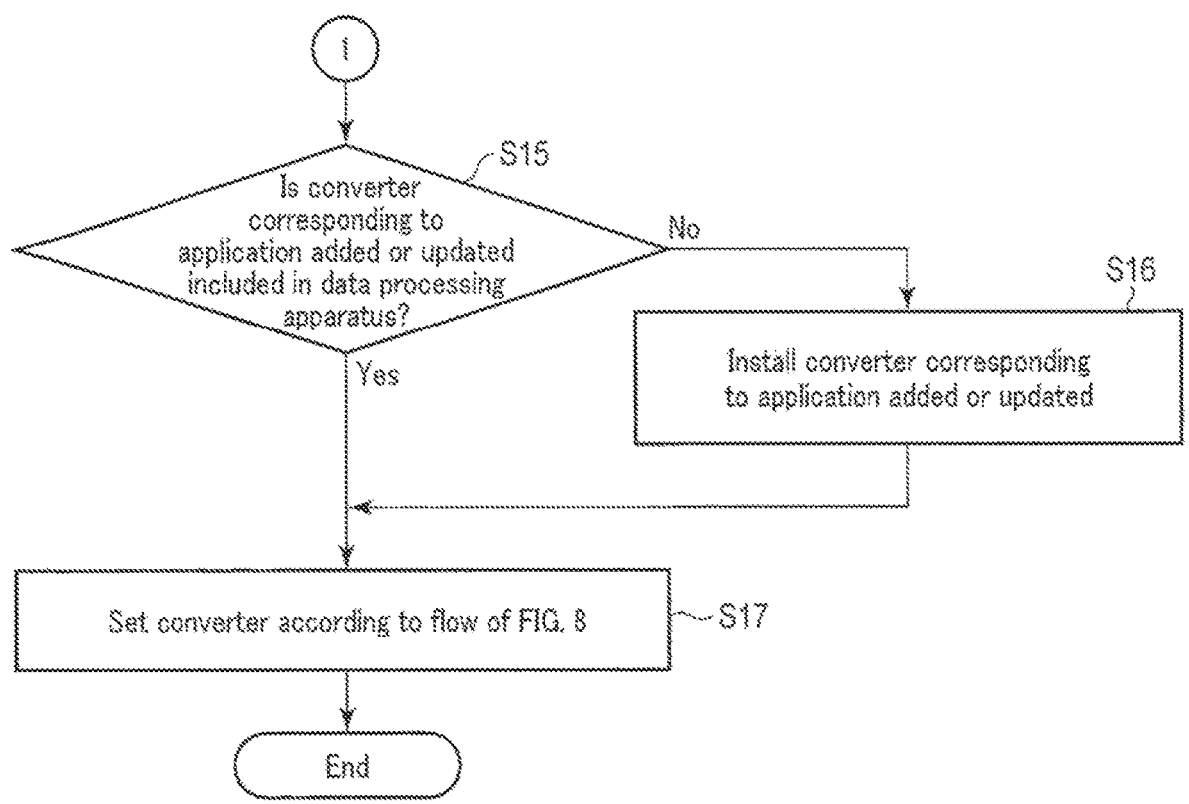
FIG. 6B is a flowchart showing an example of a processing procedure when an application is added or updated.

FIG. 6A and FIG. 6B are flowcharts illustrating an example of a processing procedure when an application is added or updated.

First, the data processing apparatus 10 receives a request to add a new application, or a request to update a version of an application (S11).

The common management unit 11 updates or refers to the data model-module version correspondence information, checks a corresponding module according to a predetermined procedure for a data model corresponding to an application to be newly added or upgraded, and confirms compatibility (S12). Details of S12 will be described later.

Next, the data processing apparatus 10 determines whether the data model corresponding to the application to be added or updated is included in the data model already installed in the data processing apparatus 10 (S13). If the corresponding data model is not included (No in S13), the data processing apparatus 10 installs a data model corresponding to the application to be added or updated (S14).

After S14 or if S13 is "Yes", the data processing apparatus 10 determines whether a converter corresponding to the application to be added or updated is included in the data model already installed in the data processing apparatus (S15). If the corresponding converter is not included (No in S15), the data processing apparatus 10 installs a converter corresponding to the application to be added or updated (S16).

After S16 or if S15 is "Yes", the data processing apparatus 10 sets the converter according to a predetermined procedure (S17). Details of S17 will be described later.

Figure 7A:
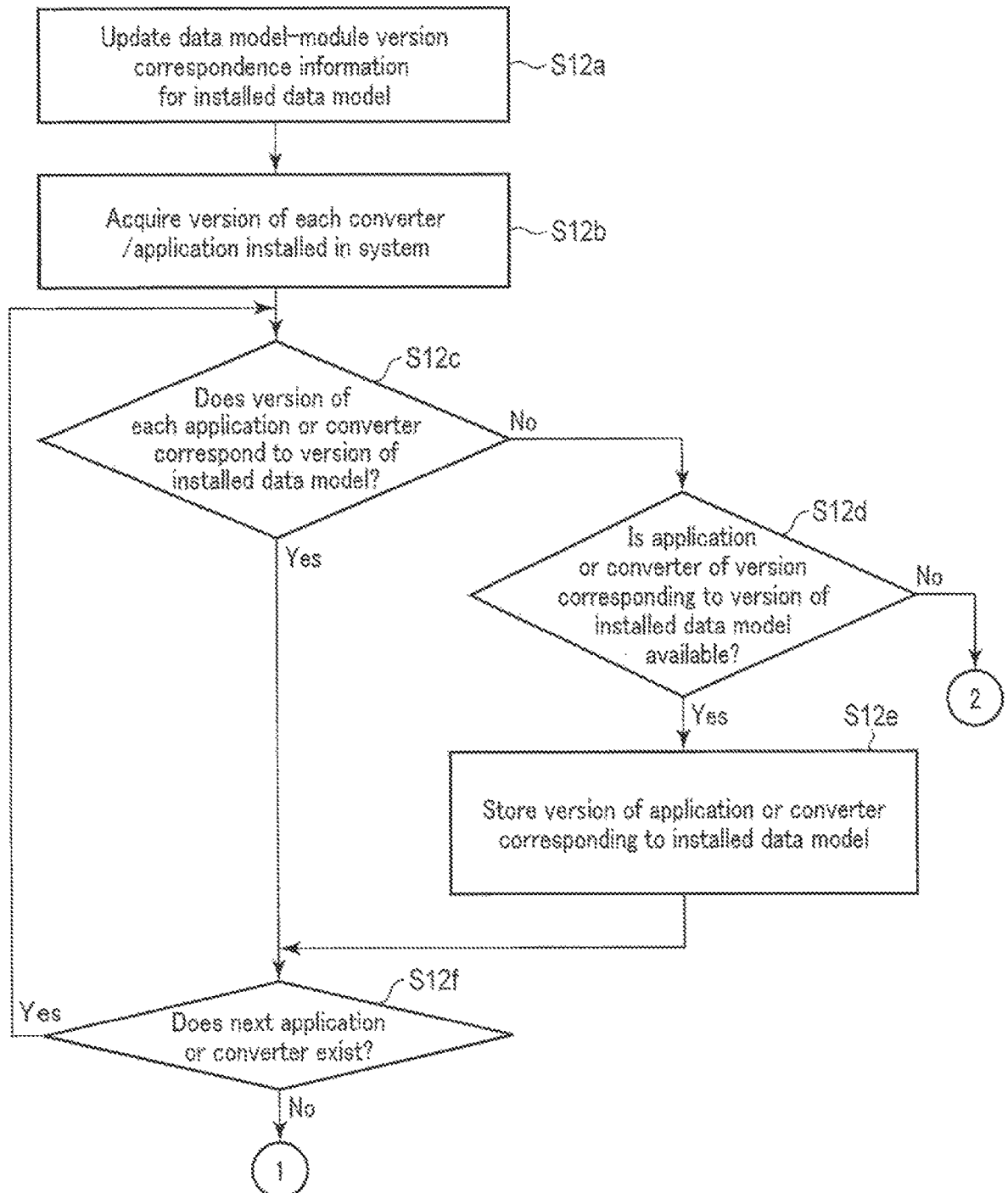
FIG. 7A is a flowchart showing an example of a processing procedure of compatibility verification.
Figure 7B:
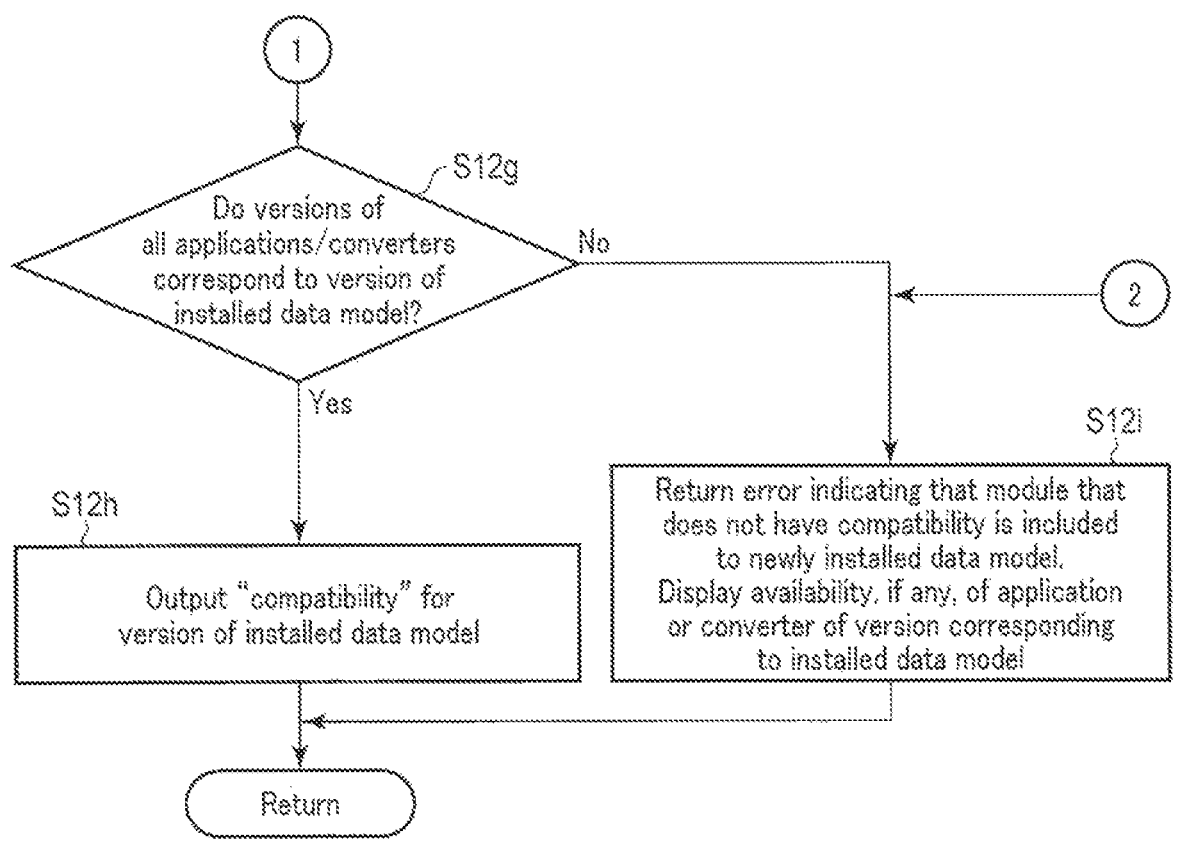
FIG. 7B is a flowchart showing an example of a processing procedure of compatibility verification.

Next, S12 will be described in detail. FIG. 7A and FIG. 7B are flowcharts illustrating an example of a processing procedure of compatibility verification.

First, the common management unit 11 updates the data model-module version correspondence information for an application and a converter corresponding to a newly installed data model (S12a).

The common management unit 11 acquires, from the data model-module version correspondence information, a version of each application and converter corresponding to the data model installed in the system (S12b).

The common management unit 11 determines whether the version of each application or converter acquired in S12b corresponds to the version of each application or converter corresponding to the newly installed data model (S12c).

If the version does not correspond (No in S12c), the common management unit 11 determines whether an application or converter having a version of each application or converter corresponding to the newly installed data model is available (S12d).

If the application or converter is available (Yes in S12d), the common management unit 11 stores the version of each application or converter corresponding to the newly installed data model in the internal memory (S12e).

After S12e or if S12c is "Yes", if the next application or converter exists (Yes in S12f), the processing of S12c and after is performed again for the next application or converter.

If the next application or converter does not exist (No in S12f), the common management unit 11 determines whether versions of all the applications/converters installed in the system correspond to the version of each application or converter corresponding to the newly installed data model (S12g).

If the version does not correspond (No in S12g) or S12d is "No", the common management unit 11 returns an error, indicating that a module not having compatibility with a module corresponding to the existing model is included, to the newly installed data model.

If an application or converter having a version of an application or converter corresponding to the newly installed data model is available, the common management unit 11 displays the availability on a display device (not shown) (S12i).

If S12g is "Yes", the common management unit 11 outputs information indicating that the version of the application/converter corresponding to the newly installed data model has compatibility with the version of the application/ converter corresponding to the existing model (S12h). After the processing of S12i or S12h, the common management unit 11 ends the processing of S12.

Figure 8:
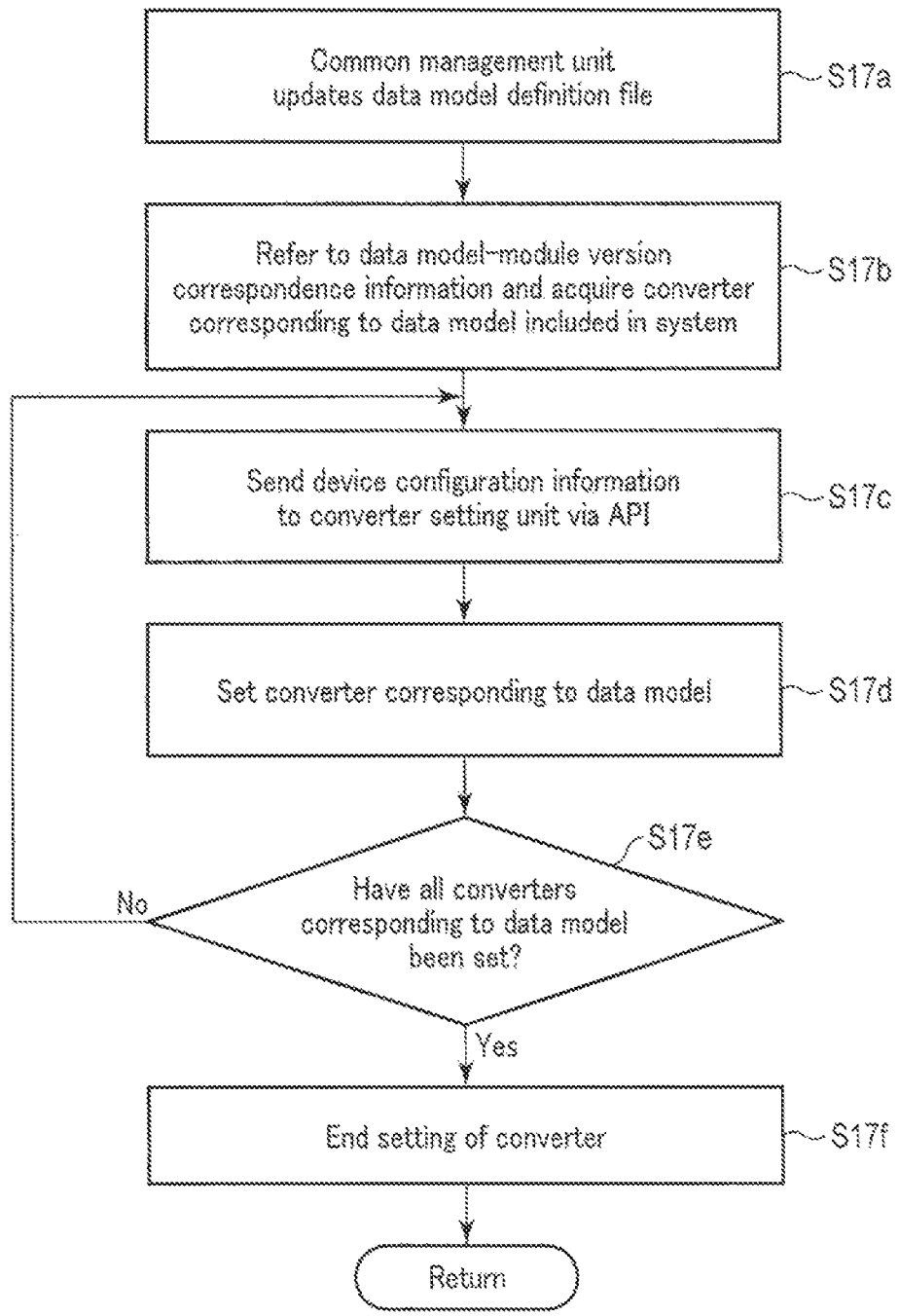
FIG. 8 is a flowchart showing an example of a processing procedure of setting a device converter.

Next, S17 will be described in detail. FIG. 8 is a flowchart illustrating an example of a processing procedure for setting the device converter.

First, the common management unit 11 updates the data model definition file (S17a).

The common management unit 11 refers to the data model-module version correspondence information, and acquires, from this information, information indicating a converter corresponding to the data model included in the system (S17b).

The common management unit 11 sends the device configuration information to the converter setting unit 14 via the API (S17c).

The common management unit 11 sets a converter corresponding to the data model (S17d).

The common management unit 11 determines whether the setting of all the converters corresponding to the data model included in the system has been completed (S17e), and if the setting has not been completed (No in S17e), the common management unit 11 performs the processing of S17c and after again for the next converter.

If S17e is "Yes", the common management unit 11 ends the setting of the converter (S17f), and ends the processing of S17.

Figure 9:
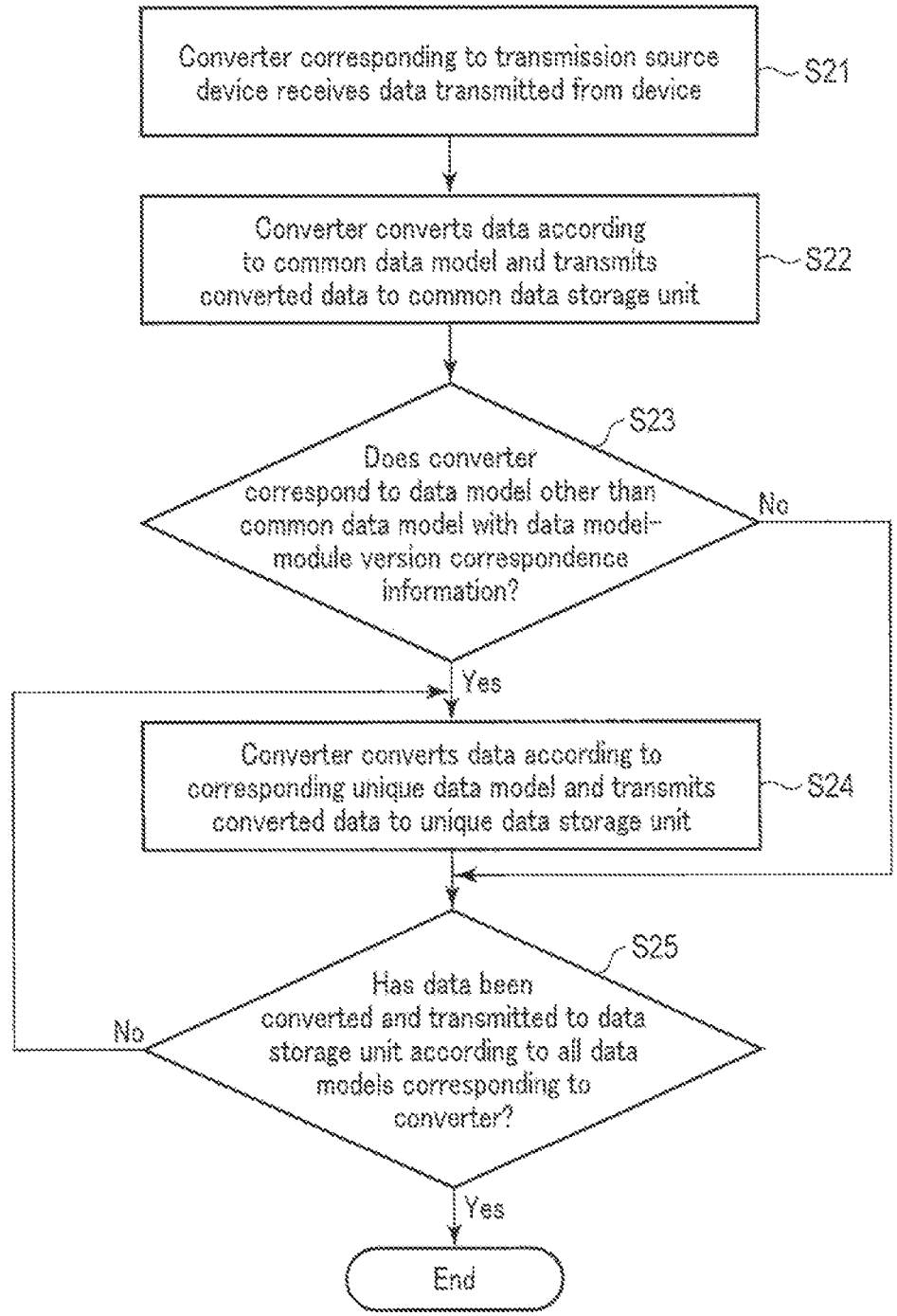
FIG. 9 is a flowchart showing an example of a processing procedure when data is stored.

FIG. 9 is a flowchart illustrating an example of a processing procedure at the time of storing data.

First, a converter corresponding to a transmission source device receives data transmitted from the device (S21).

The converter converts the data according to a common data model, and transmits the converted data to the common data storage unit 12a (S22).

The common management unit 11 determines whether the converter corresponds to a data model other than the common data model with the data model-module version correspondence information (S23).

If the converter corresponds (Yes in S23), this converter converts data according to the corresponding unique data model, and transmits the converted data to the unique data storage unit 13a (S24).

After S24 or if S23 is "No", the common management unit 11 determines whether data has been converted and transmitted to the data storage unit according to all data models corresponding to the converter (S25).

If the conversion and transmission have not been performed (No in S25), the common management unit 11 performs the processing of S24 again for the next data model. If S25 is "Yes", the common management unit 11 ends the processing related to data storage.

Figure 10:
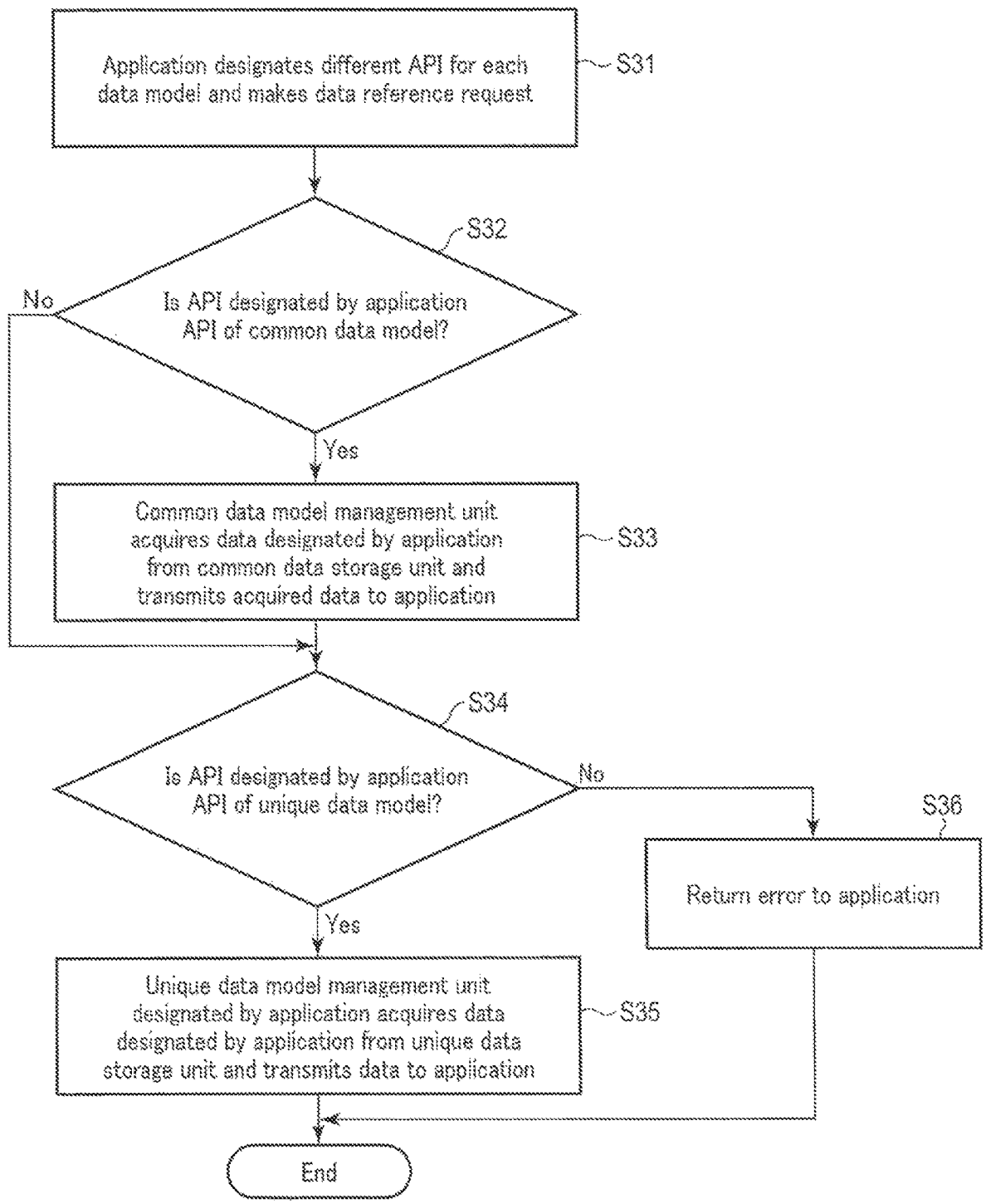

FIG. 10 is a flowchart illustrating an example of a processing operation when data from an application is referred to.

First, the application designates a different API for each data model, and makes a data reference request to the common data model management unit 12 (S31).

The common data model management unit 12 determines whether the API designated by the application is an API of the common data model (S32).

If the API is an API of the common data model (Yes in S32), the common data model management unit 12 acquires data designated by the application from the common data storage unit 12a and transmits the acquired information to the application (S33).

After S33 or if S32 is "No", the unique data model management unit 13 determines whether the API designated by the application is an API of the unique data model (S34).

If S34 is "Yes", the unique data model management unit 13 acquires the data designated by the application from the unique data storage unit 13a and transmits it to the application (S35).

If S34 is "No", the unique data model management unit 13 returns an error to the application (S36). Upon the processing of S35 or S36, the common management unit 11 ends the processing operation performed when the data is referred to.

When access control is performed, access control based on the data model definition file is performed in S33 or S35 instead of the processing performed in the step.

The access control based on the data model definition file will be described in detail.

Figure 11:
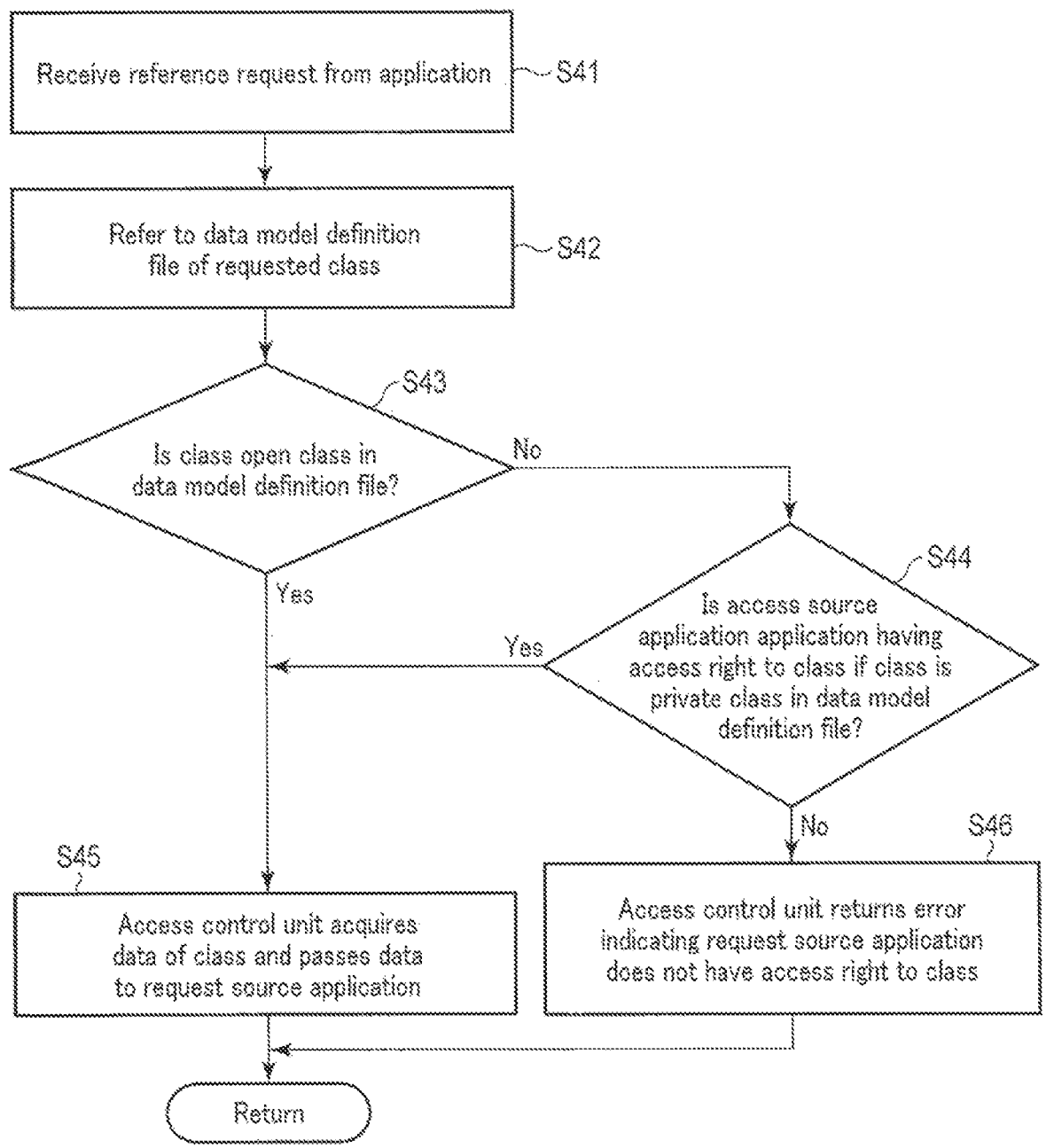
FIG. 11 is a flowchart showing an example of a processing operation of access control based on the data model definition file.

FIG. 11 is a flowchart showing an example of the processing operation of the access control based on the data model definition file.

First, the access control unit 15 receives a data reference request from an application (S41).

The access control unit 15 refers to the data model definition file of the requested class (S42).

The access control unit 15 determines whether the requested class is a open class or not in the data model definition file (S43). If the class is a open class (Yes in S43), the access control unit 15 acquires data of the class and passes it to the request source application (S45).

On the other hand, if the requested class is a private class in the data model definition file (No in S43), the access control unit 15 determines whether the access source application is an application having an access right to the class (S44), and if the access source application is an application having an access right (Yes in S44), the processing of S45 is performed.

On the other hand, if it not an application having an access right (No in S44), the access control unit 15 returns, to the request source application, an error indicating that the application does not have an access right to the class (S46). Upon the processing of S45 or S46, the access control unit 15 ends the processing operation performed when the data is referred to.

Next, specific examples of processing performed when an application is added or updated will be described (see FIGS. 1 to 3 and 6A to 8).

Here, an example will be described in which new application D (ver. 1) is added to a system including applications A, B, and C, a device-A converter (ver. 1), a device-B converter (ver. 1), and a common data model (ver. 1).

The data processing apparatus 10 receives a request from a user to add new application D (ver. 1) to the system.

The common management unit 11 updates the data model-module version correspondence information and checks the data model corresponding to the new application D (ver. 1).

The common management unit 11 checks the version of the application and the version of the converter in the unique data model NewDatamodel (ver. 1) corresponding to the new application D (ver. 1).

The common management unit 11 refers to the data model-module version correspondence information, and checks the versions of the applications A, B and C and the versions of the device-A converter and the device-B converter included in the system. The common management unit 11 checks whether these versions correspond to the version of the application and the version of the converter in NewDatamodel (ver. 1).

The common management unit 11 notifies the user when there is an application or converter that is a module that does not correspond to NewDatamodel (ver. 1). The common management unit 11 performs processing such as updating the versions of the applications A, B, and C and the versions of the device-A converter and the device-B converter included in the system to corresponding versions in New-Datamodel (ver. 1).

When the versions of all modules included in the system correspond to the version of the module to be installed, the common management unit 11 adds NewDatamodel (ver. 1) to the system, and adds or updates a necessary converter according to the device type or the like used by the application.

As an example, when the application D (ver. 1) requires the device-B converter (ver. 2), the common management unit 11 updates the device-B converter (ver. 1) to a new device-B converter (ver. 2).

When the data model is added or updated, the common data model management unit 12 and the unique data model management unit 13 send the device configuration information to the converter setting unit 14 based on the data model definition file. Based on this device configuration information, the converter setting unit 14 changes the setting of the converter.

In this example, the converter setting unit 14 changes the setting of the device-B converter (ver. 2) using the device configuration information generated based on the data model definition file of NewDatamodel (ver. 1).

This makes it possible to use the application D (ver. 1), which is a new application that stores and uses data collected from the device B according to NewDatamodel (ver. 1).

Next, a specific example of processing when data generated by the device is stored will be described (see FIGS. 1 to 3 and 9).

Here, an example in which data is stored from the device B will be described.

First, the device B sends data to the device-B converter (ver. 2) corresponding to the device B.

The device-B converter (ver. 2) converts the data according to the common data model (ver. 1) and sends the converted data to the common data storage unit 12a. This data is stored in the common data storage unit 12a.

The device-B converter (ver. 2) converts the data according to NewDatamodel (ver. 1) and sends the converted data to the unique data storage unit 13a. This data is stored in the unique data storage unit 13a.

Next, a description will be given of a specific example of processing in which data stored by an application is referred to (see FIGS. 1 to 3, 10 and 11).

Here, an example in which data is referred to from the application D (ver. 1) will be described.

First, the application D (ver. 1) designates an API including the data model name "NewDatamodel ver1" and makes a data reference request.

The unique data model management unit 13 acquires the data designated from the unique data storage unit 13a and returns it to the application D (ver. 1).

At this time, when access control to data is performed for each application, the access control unit 15 determines whether data of the requested class is made open to the request source application by the unique data model management unit 13 referring to the unique data model definition file. If the data is made open, the access control unit 15 returns the data of the requested class to the request source application.

If the data of the requested class is made private to the request source application, the access control unit 15 does not return the data to the request source application source application but reports an error.

Figure 12:
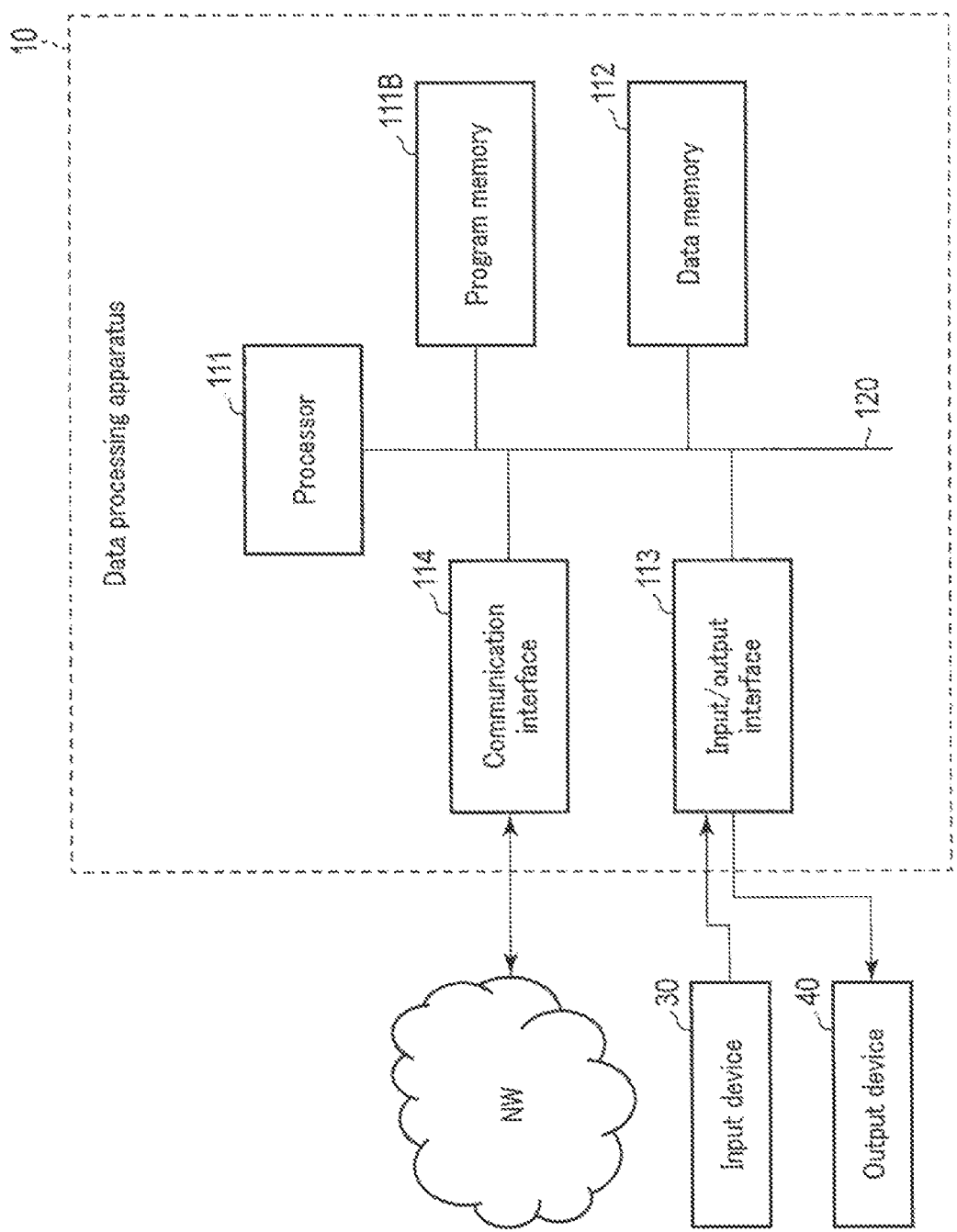
FIG. 12 is a block diagram showing an example of a hardware configuration of a data processing apparatus according to an embodiment of the present invention.

FIG. 12 is a block diagram showing an example of a hardware configuration of a data processing apparatus according to an embodiment of the present invention.

In the example illustrated in FIG. 12, the data processing apparatus 10 according to the above-described embodiment is configured by, for example, a server computer or a personal computer, and includes a hardware processor 111A such as a CPU. A program memory 111B, a data memory 112, an input/output interface 113, and a communication interface 114 are connected to the hardware processor 111A via a bus 120.

The communication interface 114 includes, for example, one or more wireless communication interface units, and enables transmission and reception of information to and from communication network NW. As the wireless interface, for example, an interface adopting a low-power wireless data communication standard such as a wireless local area network (LAN) is used.

An input device 30 and an output device 40 for an operator attached to the data processing apparatus 10 are connected to the input/output interface 113.

The input/output interface 113 takes in operation data input by an operator through an input device 30 such as a keyboard, a touch panel, a touch pad, or a mouse, and outputs output data to an output device 40 including a display device using liquid crystals, organic electro luminescence (EL), or the like to display the output data. As the input device 30 and the output device 40, a device built in the data processing apparatus 10 may be used, or an input device and an output device of another information terminal capable of communicating with the data processing apparatus 10 via a network NW may be used.

The program memory 111B serves as a non-transitory tangible storage medium, and may be a combination of a nonvolatile memory such as a hard disk drive (HDD) or a solid state drive (SSD), which allows writing and reading at any time, and a nonvolatile memory such as a read only memory (ROM), and programs necessary for executing various types of control processing according to an embodiment are stored therein.

The data memory 112 serves as a tangible storage medium, and may be a combination of the above-described nonvolatile memory and a volatile memory such as a random access memory (RAM), and is used to store data of various types acquired and created in various steps of processing.

The data processing apparatus 10 according to an embodiment of the present invention may be configured as a data processing apparatus including the common management unit 11, the common data model management unit 12, the unique data model management unit 13, the converter setting unit 14, the access control unit 15, and the converters 16a and 16b illustrated in FIG. 1 as processing function units by software.

The common data storage unit 12a, the unique data storage unit 13a, and the internal memory can be configured by using the data storage 112 shown in FIG. 12. However, the common data storage unit 12a, the unique data storage unit 13a, and the internal memory are not essential components in the data processing apparatus 10, and may be provided in an external storage medium such as a universal serial bus (USB) memory or a storage device such as a database server arranged in a cloud.

The processing function units of the common management unit 11, the common data model management unit 12, the unique data model management unit 13, the converter setting unit 14, the access control unit 15, and the converters 16a and 16b may be implemented by causing the hardware processor 111A to read and execute a program stored in the program memory 111B. Note that part or all of these processing function units may be realized by various other forms including an integrated circuit such as an application specific integrated circuit (ASIC) or a field-programmable gate array (FPGA).

Next, advantageous effects of an embodiment of the present invention will be described.

In a conventional system having only a common data model, common data is accumulated according to a basic data model common to all applications. Therefore, there was a need to perform, in each application, complicated data processing and the like related to some applications.

For example, an application that performs complicated data processing first acquires common data using a basic key such as time information defined by the common data model. The application stores the acquired data in a database, and performs complicated data processing such as statistical processing or learning processing using the stored data.

In such a case, it is necessary to perform data storing processing and reference processing multiple times in the application, and there is a problem wherein a load related to the processing in the application increases and a delay of the processing increases.

In addition, in a case where the number of applications performing such complicated data processing increases, it is necessary to hold data overlapping among multiple applications in the database, compressing the capacity of the database of the entire system.

On the other hand, in an embodiment of the present invention, the type and version of the data model corresponding to each module such as an application and a converter are automatically managed. Also, in an embodiment of the present invention, when the data model is updated, configuration information necessary for setting each module is automatically managed. Therefore, a plurality of unique data models may be applied in addition to the common data model.

Thus, an application performing complicated data processing accumulates data in advance in the unique data model in a format necessary for data processing, and directly refers to this data. Thereby, it is possible to reduce a load related to processing in the application. Therefore, it is possible to realize a flexible data model management technique for optimizing the processing of the application and reducing the disk capacity of the database.

In addition, according to an embodiment of the present invention, it is possible to share the unique data used in common by a plurality of applications from the unique data storage unit 13a of the unique data model management unit 13. Therefore, it is not necessary to manage, in the database, data items overlapping in the applications, and the capacity of the database can be efficiently used.

Further, according to an embodiment of the present invention, access control can be performed based on open/private information of the data defined for each class in the unique data model definition file stored in the unique data storage unit 13a. Therefore, as in the case where the conventional common data model is used, it is possible to share only the unique data of the class permitted to be made open for each application.

In the IoT system, a plurality of applications and devices are connected to a common system, and a new application and device are added after the system is constructed.

In an embodiment of the present invention, a unique data model definition file is managed so that data models can be added or updated while compatibility with older data models and system-wide consistency are maintained. Thereby, it is possible to flexibly deal with applications and devices to be added after the IoT system is released.

In an embodiment of the present invention, focusing on the point that there are differences in data models necessary for each application and device, the compatibility between data models is managed and verified, and information generated based on the data models is managed in a centralized manner. This enables flexible management of data models.

According to the first aspect of the information processing apparatus according to an embodiment of the present invention, the compatibility between the version of the module corresponding to the common data model and the version of the module corresponding to the newly installed data model is verified. Thereby, the unique data model corresponding to the new data model may be applied in addition to the common data model.

According to the second aspect of the information processing apparatus according to an embodiment of the present invention, the version of the module corresponding to the common data model is updated so as to correspond to the version of the module corresponding to the newly installed data model. Thus, the version of the module corresponding to the common data model may be optimized in accordance with the newly installed data model.

According to the third aspect of the information processing apparatus according to an embodiment of the present invention, in the information indicating the data model, addition of a new class or a new relation between classes is permitted, whereas change or deletion of an existing class or an existing relation between classes is not permitted. Thus, it is possible to maintain compatibility between the new data model and the existing data model, and it is possible to prevent a problem in the operation of the application program using the existing data model.

According to the fourth aspect of the information processing apparatus according to an embodiment of the present invention, the information indicating the data model includes information indicating whether the class corresponding to the module is made open or private to the application program. Thus, only a specific application program may be permitted to use the data.

The methods described in the embodiments can be stored as programs (software means) that can be executed by a computer, in a recording medium such as a magnetic disk (Floppy (registered trademark) disk, hard disk etc.), an optical disk (CD-ROM, DVD, MO etc.), and a semiconductor memory (ROM, RAM, flash memory etc.), or can also be transferred and distributed by means of a communication medium. Note that the programs stored in a medium may include a configuration program for configuring, in the computer, software means (including not only an execution program, but also a table and a data structure) that is to be executed by the computer. The computer that realizes the present apparatus loads the programs stored in the recording medium, configures the software means using the configuration program depending on the case, and performs the above-described processing due to operations being controlled by the software means. Note that the "recording medium" mentioned in the present specification is not limited to one for distribution, but may also include a recording medium such as a magnetic disk, a semiconductor memory, or the like that is provided in a device installed inside the computer or connected thereto via a network.

Note that the present invention is not limited to the above embodiments, and may be modified in various manners without departing from the gist of the invention at the implementation stage. The embodiments may be combined as appropriate as much as possible, and in this case, combined effects can be achieved. Furthermore, the embodiments include the various inventions, and various inventions may be extracted by combining a plurality of disclosed constituent elements.

REFERENCE SIGNS LIST

10: Data processing apparatus
11: Common management unit
12: Common data model management unit
12a: Common data storage unit
13: Unique data model management unit
13a: Unique data storage unit
14: Converter setting unit
15: Access control unit
16a, 16b: Converter

The invention claimed is:

1. An information processing apparatus, comprising:
a common data model management unit that manages information, generated from a common data model corresponding to all of a plurality of modules in common, and is a common data model definition file defining openness/privateness of a class that is a configuration unit related to the common data model;
a unique data model management unit that manages information generated from a unique data model corresponding to at least one of the modules, and is a unique data model definition file defining openness/privateness of a class that is a configuration unit related to the unique data model; and
a common management unit that manages a version of a module corresponding to the common data model, a version of a module corresponding to the unique data model, and a version of a module corresponding to a newly installed data model, and verifies compatibility of the versions.

2. The information processing apparatus according to claim 1, wherein when the version of the module corresponding to the common data model managed by the common data model management unit does not correspond to a version of a module of a same type corresponding to the newly installed data model, the common management unit updates the version of the module corresponding to the common data model managed by the common data model management unit to correspond to the version of the module of the same type corresponding to the newly installed data model.

3. The information processing apparatus according to claim 1, wherein
the information indicating the common data model managed by the common data model management unit and the information indicating the unique data model managed by the unique data model management unit includes information indicating a class corresponding to the module and the managing includes permitting addition of a new class or addition of a new relation between classes and not permitting changing or deletion of an existing class or changing or deletion of an existing relation between classes.

4. The information processing apparatus according to claim 1, wherein
the module includes an application program, and
the information indicating the common data model managed by the common data model management unit and the information indicating the unique data model managed by the unique data model management unit include information indicating a class corresponding to the module and indicating whether the class is made open or private to the application program.

5. An information processing method performed by an information processing apparatus, the method comprising:
managing information, generated from a common data model corresponding to all of a plurality of modules in common, the information including a common data model definition file defining openness/privateness of a class that is a configuration unit related to the common data model;
managing information, generated from a unique data model corresponding to at least one of the modules, the information including a unique data model definition file defining openness/privateness of a class that is a configuration unit related to the unique data model; and
managing a version of a module corresponding to the common data model, a version of a module corresponding to the unique data model, and a version of a module corresponding to a newly installed data model, and verifying compatibility of the versions.

6. A non-transitory computer readable storage medium storing an information processing program for causing a processor to function as each unit of the information processing apparatus according to claim 1.

* * * * *